Patented Aug. 14, 1934

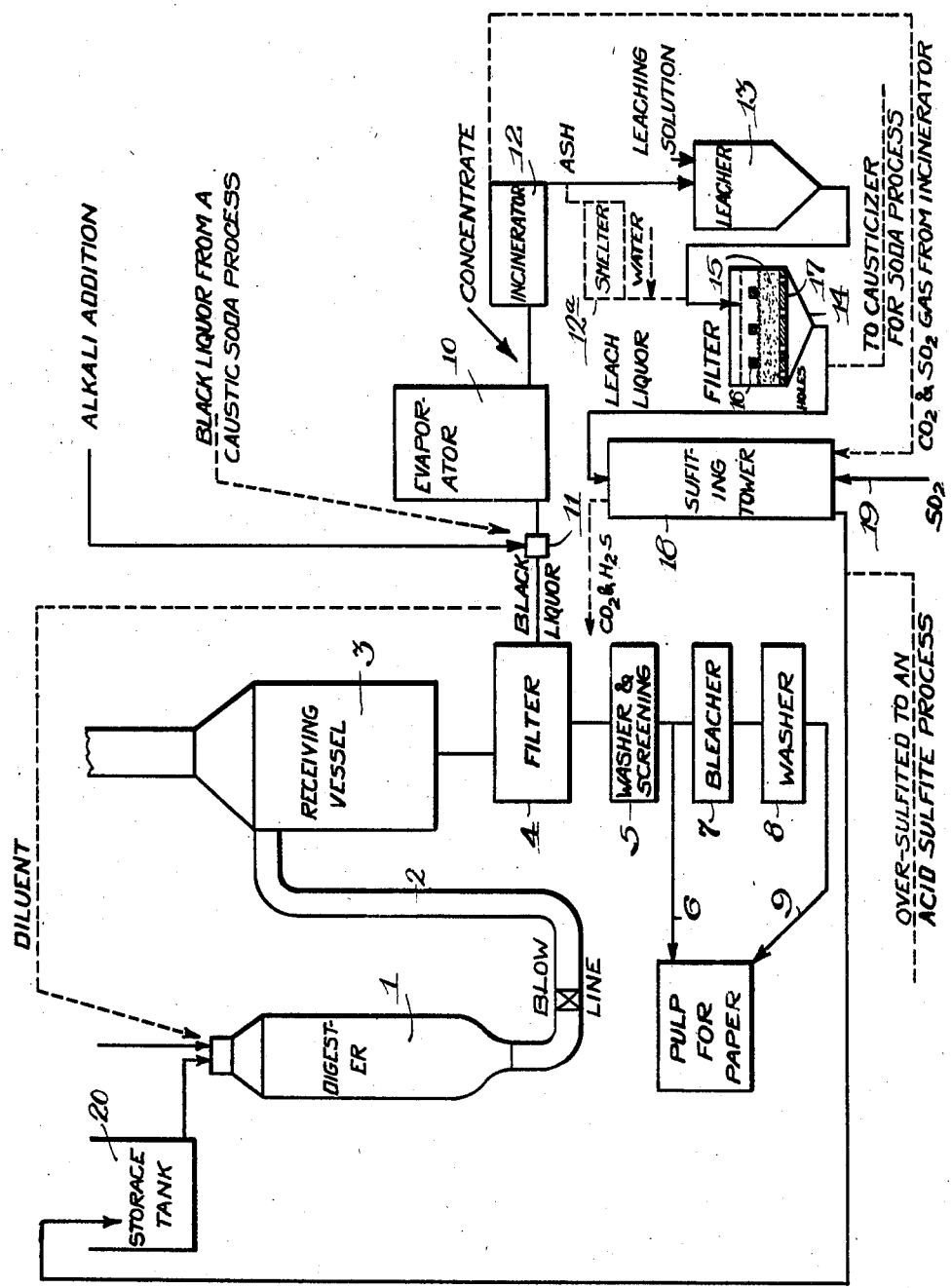

1,970,258

UNITED STATES PATENT OFFICE 1,970,258

MANUFACTURE OF PULP

Clinton K. Textor, Cloquet, Minn., assignor to The Northwest Paper Company, Cloquet, Minn., a corporation of Minnesota Application October 18, 1929, Serial No. 400,481

15 Claims. (Cl. 23—129)

This invention relates to the preparation of liquor for cooking cellulosic materials with monosulphites and to the treatment and recovery of waste liquor from such cooking operations, for reuse of the chemicals in similar or in other cooking processes.

The invention herein described is in part a division of each of copending applications Serial Nos. 135,929 and 135,930, both filed September 15, 1926 and is filed in compliance with the requirements of the Patent Office that the claims appended hereto be divided from said applications.

Among the objects of this invention are the preparation of a suitable cooking liquor for practicing the invention set forth in said original applications Serial Nos. 135,929 and 135,930; the treatment of waste liquor from said cooking operations to recover chemicals therein, to mix with the waste liquor other materials which facilitate the recovery and which are useful in subsequent use of recovered materials; to convert the recovered chemicals either wholly or in part into cooking liquor for the cooking process from which they are primarily derived; and to convert the recovered chemicals either wholly or in part into other cooking liquors or into other useful processes.

Still another object of the invention is the conjoint operation of diverse cooking processes so as to mingle waste liquors of one process wholly or in part with waste liquor from another or other processes to facilitate the economical recovery of chemicals and the preparation of cooking liquors for one or more of the processes.

A specific object of the invention is the addition of an alkali to waste liquor from a cooking process employing essentially, substantial amounts of a sodium sulphite, to render the waste product alkaline for purposes of evaporation and protection of the evaporating apparatus.

Other objects and advantages of my invention will be apparent to those skilled in the art from the following specification. The accompanying figure shows, more or less diagrammatically, one arrangement of apparatus capable of carrying out the process of this invention, but it is to be understood that this illustration is given only for the purpose of facilitating an explanation of the process, and it is not to be construed as a limitation of the invention short of its scope as comprehended in the appended claims.

In 1880, Cross made known the utility of sodium sulfite as a wood digestant. Since that time a number of modifications have appeared in the literature and in patents of the United States, Germany, Canada and Great Britain. This art shows that it is considered necessary, when using an essentially sodium sulfite cooking liquor, comprising, principally, the normal sodium salt ($Na_2SO_3$), to have present caustic soda (NaOH) to dissolve the silicates and aluminates found in cellulose bearing materials, such as wood. Schacht's German Patents Nos. 122,171 and 131,118 specifically require the presence of small amounts of caustic soda. Other investigators have deemed it necessary to have still larger amounts of caustic soda present in the normal sodium sulfite cooking liquor, especially when highly resinous woods are used. I have found that it is not necessary to have caustic soda (NaOH) present in such a sulfite liquor to produce a satisfactory pulp, and that there are certain advantages in operation and certain improvements in the pulp resulting directly from replacing the stronger caustic soda of the prior art with a milder alkali carbonate, such as sodium bicarbonate, or sodium carbonate.

By my method of cooking, which is described in detail hereinafter, I obtain a high yield of well cooked pulp, in some cases as high as 50% (for long-fibered wood) to 60% (for short-fibered wood) of the weight of the wood employed, both being calculated on oven dried material. The product thus produced is of specially good strength, has an unusually white color for unbleached pulp, and possesses those characteristics essential for the manufacture of strong durable paper of the highest grade. The pulp is readily bleached to a good white color, the bleached pulp retaining practically all of the desirable properties of the unbleached pulp.

Although several modifications are possible without departing from the spirit of my invention, I prefer to carry out the cooking process as described in detail hereinafter. In considering the exemplary figures and details hereinafter disclosed, it is to be understood that the temperature and the proportions of material to wood may be varied according to the type of wood, the moisture content of the wood, the kind of pulp desired, and other factors hereinafter described, as carried out with jack pine.

The digester 1 is filled to the desired height with jack pine chipped to a convenient size, and the cooking liquor is added in volumes, similar to those used for cooking wood by the soda, or the sulfate process, as is well known to those versed in the art. I find it desirable to add from one-quarter to three-quarters cubic foot of cooking liquor per cubic foot of chips as they lie in the digester, depending upon the moisture content of the wood, the method of circulating the liquid, the method of heating, and other factors. The preferred cooking liquor is of such a concentration that there is added for every hundred pounds of oven dried chips from 30 to 55 pounds, but preferably from 40 to 45 pounds of sodium sulfite ($Na_2SO_3$) and from 1.5 to 3.0 pounds of sodium bicarbonate ($NaHCO_3$), together with known amounts of such other salts, notably sodium thiosulfate ($Na_2S_2O_3$), as may be present as impurities. When it is necessary to dilute the cooking liquor for use in the digester, a waste black liquor, more particularly described hereinafter, or black liquor containing washings, may be used in place of water without any detrimental results.

The detailed method of preparing the cooking liquor either as a fresh solution or as a regenerated solution is disclosed more particularly in the ensuing description. Such cooking liquor has been found to have an alkalinity equivalent to a hydrogen ion concentration expressed in the terms of pH of from about 7.5 to 9.5, and at no time during the cooking process does this liquor become acid. It is understood that neutrality between acidity and alkalinity is to be referred to water which has a pH equal to approximately 7.0, and, further, that all pH values herein given are measured at laboratory temperatures. I have found that a measurable alkalinity is required to minimize corrosion to such an extent that an unlined steel or iron digester may be used without excessive corrosion. It is not necessary to use more than the above mentioned amount of alkali carbonate to safeguard against excessive corrosion. In using greater quantities of carbonate no additional advantages have been observed. It is important that the carbonate employed be present in addition to the amount of sodium sulfite required and not in substitution therefor. The quantity of sodium sulfite considered necessary for the process is deemed otherwise important in at least one particular circumstance. I have found that the preferred liquor in the quantities stated must contain sufficient sodium sulfite ($Na_2SO_3$) to prevent the production of black or dark brown pulp by any sodium thiosulfite ($Na_2S_2O_3$) which may be present as an impurity, as hereinafter explained. It appears that if the normal sulfite becomes exhausted in the process of the digestion, the thiosulfate then acts predominantly upon the pulp disadvantageously, producing a dark colored product.

The cooking process is preferably carried out in an unlined steel digester by a procedure similar to that of the soda or a modified soda process. By a soda process, I refer to one which employs caustic alkali (NaOH) as the pulping agent, while by a modified soda process, I refer to a soda process in which the liquor consists chiefly of caustic alkali, but to which sodium sulfide ($Na_2S$) or sodium sulfite ($Na_2SO_3$) or other materials have been added. A temperature of 175° to 185° C. is preferred and the corresponding saturated steam pressure is maintained within the digester. These temperatures are not to be construed as limits, because a temperature of 188° has been successfully employed. In using the above quantities of material, it is to be understood that the digester is heated by introducing steam directly into it. Heating may also be done indirectly by a suitable adjustment in the volume and concentration of the liquor employed. The time of cooking generally varies from six to twelve hours, depending upon the grade of pulp desired and the conditions of cooking. For example, when a wrapping paper pulp is desired, the cooking lasts for about eight hours. The first two to three hour period is used for attaining the desired temperature and pressure. The digester is relieved of non-condensing gases throughout the cooking operation either periodically or continuously. At the end of the cooking operation, the digester is blown in the usual manner through a blow line 2 into a receiving vessel, indicated at 3.

The next step in the process is to free the pulp from the liquor resulting from the digestion, this liquor hereinafter being referred to as "black liquor". The separation is herein accomplished by means of a continuous filter, indicated at 4, from which the pulp is discharged in one direction and the black liquor in another. The pulp is then subjected to a thorough washing and screening operation, as indicated generally at 5, to remove undigested pieces of wood and to free it from traces of the discoloring black liquor. Thorough washing is essential for the production of a pulp with a good natural color, which is easy-bleaching. This washed pulp may, if desired, be used for paper without further treatment, as indicated at 6. Such a pulp, as made by this process, has been very slightly acted upon by the cooking liquor; it has a very light tan color comparable to easy-bleaching sulfite pulp, but possesses a strength equivalent to that of a good kraft pulp. The pulp is practically resin-free, and is capable of being readily semi-bleached by treatment with about 16% to 20% (based on the air dried weight of pulp) bleaching powder containing 35% available chlorine, and it may be fully bleached with about 30% to 40% of such bleaching powder to form a brilliant, lustrous color equivalent to, and usually better than, stock prepared by an acid sulfite process. By an acid sulfite process, I refer to one in which the cooking solution contains about four to six percent of sulfur dioxide, of which 1% to 1½% is combined with a base, such as sodium, calcium or magnesium, the rest being present as "free" sulfurous acid. In the semi-bleaching operation, above referred to, the pulp does not lose its strength. The results of strength tests made on semi-bleached pulp show that the stock is even slightly stronger than the unbleached pulp. The fully bleached pulp, above referred to, has a color equivalent to, and a strength 25% to 35% greater than, the best bleached sulfite pulp. Consequently, the pulp of the present process lends itself to a large number of uses in the paper mill, as it possesses a desirable unbleached color and has the bleach-ability of sulfite pulp, and the high strength of kraft pulp. In the diagram, the bleaching is represented at 7, and the subsequent washing at 8, such pulp being used for paper of high grade, as shown at 9.

Another feature of the process is the cyclic operation as regards the base metal of the digestion liquor. Since sodium is by far the cheapest and the preferred base, the process will be explained in detail with reference to the said liquor. In general, the preferred steps of regeneration comprise concentration of the black liquor resulting from the digestion, incineration to burn out the organic matter, bleaching of the ash from the incineration, giving substantially a sodium carbonate ($Na_2CO_3$) solution, and sulfiting of the leach liquor with sulfur dioxide ($SO_2$) to form sodium sulfite ($Na_2SO_3$) and to lease a predetermined amount of unsulfited soda, preferably as sodium bicarbonate ($NaHCO_3$).

In the concentration of the black liquor, I have used a quadruple effect high speed tubular evaporator in which the upper part of the body of liquid being evaporated is contained in the lower ends of a series of tubes, as represented in the drawing at 10. Considerable trouble has been experienced in so evaporating this liquor because it deposits solids during the concentration. The solids deposited are, primarily, organic compounds which adhere to the tube walls and gather on the bottom of the evaporator, making it necessary to clean the latter several times a day. Such a condition prevents continuity in concentrating and is generally very undesirable, whatever type of evaporator is used.

I have found that the addition of a caustic alkali, such as sodium hydroxide ($NaOH$), to the black liquor prevents the deposition of such solids, and permits continuous evaporation to be carried out in the system described to a concentration of 36° to 40° Bé. (45% to 55% solids) measured at 60° F. The evaporator can thus be operated continuously for several weeks as compared to a few hours. The addition of alkali may be made just prior to the entry of the black liquor into the evaporator, at the point 11 in the drawing.

The addition of caustic alkali leads to numerous unexpected advantages. It is customary in most cyclic processes to supply at some point fresh material to replace what is incidentally lost throughout the cycle. Since sodium is the constituent which is re-cycled, the addition of sodium hydroxide for the purpose above described also provides the necessary amount of replenishing material. The substance added may be pure caustic soda, solid or in solution, but, inasmuch as the black liquor is heavy with impurities and is later subjected to purifying operations, a very impure, and, hence, very cheap caustic soda may be employed. Consequently, it is a general practice to employ a waste liquor from some other process which will provide the required caustic soda, such, for example, as the black liquor from some soda process of pulp formation.

The effect of the caustic soda is to increase the alkalinity of the black liquor to be concentrated. Tests on several black liquors show an increase in alkalinity from pH 8.5 to about pH 9.2 upon addition of caustic soda through the medium of black liquor from a caustic process and a further increase to pH 9.6 when additional caustic alkali ($NaOH$) is added to the mixed black liquors. The amount of caustic to be added is immaterial so long as a sufficient amount is added to avoid the troublesome conditions above described. The result desired is the guide to the amount required and this varies with the type of wood for which the liquor has been used, the time of cooking and other specific conditions.

The syrupy mass or concentrate from the evaporator may be dried or run directly to an incinerator, various types of which are well known to the art. Since the organic content of the concentrate is sufficient to provide, upon combustion, the necessary heat to operate the mill, it is quite important that it be in the so-called soluble condition effected by the caustic addition. The alkaline concentrate, acting as a vehicle for the organic matter, permits it to be pumped and conducted by pipe lines to the incinerator, whereinto it may be sprayed as a liquid fuel. This not only increases the efficiency of the equipment, but it also eliminates the necessity of handling the solids which otherwise would settle out on concentration, the danger of human contact with chemically charged solids, the labor incident to its removal, the problem of disposal, and the uncertainty of the operations.

One method of recovering sodium carbonate from the black liquor concentrate is partly to incinerate the ash, not to completion, however, and to transfer the partly incinerated ash to a smelter which completely removes the carbonaceous material and discharges a fused sodium carbonate containing some impurities. This smelt is dissolved to form essentially a sodium carbonate solution.

The preferred method of treating the black liquor concentrate is to pass it through an incinerator 12 without approaching the fusion state. This results in an ash which is primarily sodium carbonate with some free carbon, depending in amount upon the extent to which it has been burned. Furthermore, it may contain sodium sulfide ($Na_2S$) formed by the reduction of certain of the sulfur compounds, and small amounts of other substances. The incinerator ash is leached, as indicated at 13, with water or with some suitable solution which is to be enriched in sodium carbonate ($Na_2CO_3$). The leach liquor is then filtered through a suitable filter, as indicated at 14. I have found that sawdust 15 is a most satisfactory filtering medium. It has the advantageous property of removing suspended solids, chiefly carbon, without clogging. It is more efficient than sand in this respect, being lighter, more porous, and has a higher specific surface. I have used the sawdust in a bed to a depth of about three feet, the sawdust bed being confined or weighted down, as at 16, to guard against floating when immersed. The tendency of sawdust to float, being greater than that of sand, causes the bed to rise or expand rather than to pack when used in a tank with a drainer bottom 17.

In practice, I have found it economical and otherwise beneficial to prepare the filtered leach liquor from the ash of the concentrated combined liquors obtained both from the digestion step of the present invention and from the old and well known caustic soda digestion processes. In Table I, following, there are shown analyses of two samples, designated A and B, each being a composite of forty samples of such leach liquor.

*Table I*

|  | Pounds per cubic foot | |
| --- | --- | --- |
|  | A | B |
| Sodium carbonate | 13.20 | 12.75 |
| Sodium sulfite | .37 | .44 |
| Sodium thiosulfate | .21 | .15 |
| Sodium sulfide | 1.09 | 1.43 |
| Sodium sulfate | 1.20 | 1.04 |

Working under ideal conditions of incineration, all sulfur would be roasted out leaving a pure sodium carbonate ash which would yield an ideal leach liquor containing only sodium carbonate ($Na_2CO_3$). Practically, such an ideal condition is not attainable, and furthermore, it is not necessary. However, when desired the effect of these impurities may be minimized by a special treatment of the leach liquor when it is, for any reason, desired to approach the ideal condition. The sulfiting of the leach liquor with sulfur dioxide ($SO_2$) initiates a series of reactions forming sodium thiosulfate ($Na_2S_2O_3$) from sodium sulfide ($Na_2S$). This formation of sodium thiosulfate may be prevented by treating the leach liquor with carbon dioxide ($CO_2$) taken, for example, from flue gases, forming hydrogen sulfide ($H_2S$) and sodium bicarbonate. The normally gaseous but water-soluble hydrogen sulfide is retained by the solution being treated. This condition effects a counter-reaction requiring the use of a considerable excess of carbon dioxide to remove the hydrogen sulfide ($H_2S$) from solution and thereby to permit continued conversion of the sodium sulfide into the bicarbonate. As there are large amounts of carbon dioxide available from flue gases, the excess required is no practical disadvantage to this operation from a chemical standpoint. From the standpoint of mechanical operation, however, it is possible to view this carbon dioxide treatment as an extra operating step in the regeneration. Such is not the case, for I have found it possible to combine this step with the sulfiting step.

The leach liquor containing the sulfide is run against a counter-current of gas containing sulfur dioxide and carbon dioxide, the latter being preferably in excess, so that substantially all the sulfur dioxide is absorbed whereby to permit carbon dioxide to flow on. Thus, the excess of carbon dioxide meets the incoming leach liquor, which at this stage may be rapidly re-circulated in the path of the carbon dioxide. The carbonic acid gas converts both the sodium sulfide and the sodium carbonate to bicarbonate, and removes the resulting hydrogen sulfide. The sodium bicarbonate then absorbs the sulfur dioxide forming the normal sulfite, the extent of this reaction being controlled to form the desired composition of the emergent solution.

In the drawing, this treatment is represented as optional by dotted lines. An absorption tower 18 receives the leach liquor at the top, and a stream of mixed gases enters the bottom of the tower. These gases are preferably taken from the incinerator 12, thus to effect a substantial recovery of the sulfur employed in the process, and an advantageous use of the carbon dioxide from the combustion of the black liquor concentrate.

The better practice, however, is to so effect the incineration of the black liquor that the impurities occuring in the leach liquor may be neglected. In such a case, the leach liquor is sulfited directly by passing sulfur dioxide gas into the absorption tower 18, as represented at 19, until the liquor exhibits a predetermined composition of sodium sulfite ($Na_2SO_3$) and of unsulfited soda. A part of the original sodium carbonate will not be sulfited, but it will be acidified to sodium bicarbonate by action of the sulfurous acid ($H_2SO_3$), formed upon the solution of the sulfur dioxide gas in the water. When the bicarbonate content is in the region of 0.50 to 0.75 pounds per cubic foot of solution, the sulfiting is deemed complete for the preparation of the preferred cooking liquor, above described, and it is, consequently lead to a storage tank 20.

For the purpose of explaining more in detail the various changes which occur during sulfiting, the following reactions are given:

(1) $SO_2 + H_2O = H_2SO_3$
(2) $Na_2CO_3 + H_2SO_3 = H_2CO_3 + Na_2SO_3$
(3) $Na_2CO_3 + H_2CO_3 = 2NaHCO_3$
(4) $2NaHCO_3 + H_2SO_3 = Na_2SO_3 + 2H_2CO_3$

In view of the above and of the preceding description, it should be understood that all the reactions are allowed to go to completion, except reaction 4. The supply of $SO_2$ forming $H_2SO_3$ by reaction 1 is cut off sufficiently early to leave the required amount of sodium bicarbonate ($NaHCO_3$) formed by reaction 3, and to prevent its being completely sulfited by reaction 4.

The above described operation of sulfiting results in a suitable sulfite cooking liquor for use in the digesting step of this invention. Table II gives actual analyses of two samples, C and D, of such cooking liquor, each being a composite of forty samples.

*Table II*

|  | Pounds per cubic foot | |
|---|---|---|
|  | C | D |
| Sodium bicarbonate | .79 | .92 |
| Sodium sulfite | 12.40 | 12.70 |
| Sodium thiosulfate | 2.08 | .98 |
| Sodium sulfate | 1.07 | 1.00 |

Such a cooking liquor containing impurities, as above displayed, is quite suitable for the cooking of wood by my method. It has not been observed that impurities to the amount above stated have any appreciable effect upon the quality of the pulp produced over that which is produced in the absence of such impurities. No claim is made to the presence of these contaminating materials, and it is to be understood that they are merely incidental to a practical operation of the process hereinafter more particularly defined in the appended claims.

It should be explained at this point that heating a bicarbonate solution will cause reaction 3 to proceed in the reverse direction forming carbonic acid which breaks down into water and gaseous water-soluble carbon dioxide ($CO_2$). Since sodium bicarbonate is used in the digestion and is under heat, it is evident that it breaks down forming carbon dioxide and sodium carbonate ($Na_2CO_3$). The carbon dioxide is released from the digester from time to time along with other gases formed in the process. It is difficult then to ascertain the ratio of normal carbonate to bicarbonate during the cooking process. The escape of the acid constituent ($CO_2$) during digestion thus permits an increase in the alkalinity due to sodium carbonate ($Na_2CO_3$). Such an increase has been observed as will hereinafter be explained.

The cooking liquor containing essentially sodium sulfite and sodium bicarbonate, and incidentally a number of impurities as exemplified by Table II, initially has a measured alkalinity of a pH of about 7.5 to 9.5. After it has been employed in wood digestion and is recovered as black liquor, its pH value is about 8.5 to 10.5. At no time during the cooking operation does the pH value fall below substantially 7, which is the dividing line between alkalinity and acidity. This is an important feature of the invention, since liquors which are below pH 7 are considered as being acid and to have a corrosive action on steel digesters. I have found by experience that when the alkalinity is maintained about pH 7.5 there is a minimum of corrosion. It has been observed that under these conditions a black adherent film forms on the steel digester, and this film apparently aids in preventing the cooking liquor from attacking the underlying steel. It has further been observed that if the liquor has an initial pH less than 7.5, the alkalinity drops to a value during certain stages of the cooking, which permits corrosion in spite of the black film. Long experience has shown that this lowering of the alkalinity during the first part of the cooking process is not permanent, and that the alkalinity subsequently rises again during the continuance of the cooking operation. The rise is due in all probability to the escape of the acid constituent $CO_2$, acetic acid and other gases, probably acidic in character, as heretofore explained. The decrease or drop during the initial stages may be explained by a variety of hypotheses, which, however, will be omitted. It is sufficient to state that the alkalinity decreases and corrosion occurs if the initial alkalinity is too low. Consequently, sufficient alkali carbonate is initially present to give a pH of 7.5 or greater. A larger quantity may be used, but apparently no additional protection is obtained.

The foregoing description of the cooking liquor has been directed, generally, to that prepared from leach liquor. It is, of course, to be understood that it may be prepared by sulfiting a sodium carbonate solution prepared from the commercial salt ($Na_2CO_3$). For example, a solution containing eleven pounds of sodium carbonate ($Na_2CO_3$) per cubic foot is sulfited by passing in sulfur dioxide ($SO_2$) until there remains only .50 to 0.75 pounds of sodium bicarbonate ($NaHCO_3$) per cubic foot.

It is further to be understood that the solution may be prepared by mixing either the salts or the salt solutions of $NaHCO_3$ and $Na_2SO_3$ to a similar concentration. In the process of sulfiting, the bicarbonate is produced from the normal carbonate as an incident to the sulfiting which cannot easily be avoided. However, when the salts are mixed without a sulfiting operation, the cooking liquor may contain normal sodium carbonate and sodium sulfite, the sodium bicarbonate not being essential when the normal carbonate is present.

In the practical operation of the process it is most desirable to regenerate the liquor, but the process, chemically, is not dependent upon this type of liquor. A fresh liquor may be used when desired and may be made by any method which arrives at the desired proportions of alkali carbonate and normal alkali sulfite. One such method is to sulfite a fresh sodium carbonate solution ($Na_2CO_3$) until the requisite amount of soda remains unsulfited. Another method is to sulfite a pure, or a carbonate-containing, caustic soda (NaOH), making up any deficiency in carbonate by an addition thereof. Still another feature of the process is the flexibility of its recovery steps, not only to receive waste materials from other processes, but also to provide material for use in other processes. This permits conjoint operation of several distinct digestion processes with a mingling of materials between them, and permits, further, the use of the same apparatus for the conjointly operated processes. Not only may the several processes be simultaneously operated, but one may be readily followed by another because of this advantageous relation. Such a condition reduces the amount of equipment required and gives a well equipped plant a wide flexibility in the use of apparatus and processes. For example, the soda process which employs caustic soda (NaOH) as the basis of the digestive liquor may utilize the leach liquor for causticizing with lime. The leach liquor, which is high in sodium sulfide ($Na_2S$), may be causticized with advantage for the sulfate process. Thus, at any time when the leach liquor is deemed too high in sodium sulfide for the better requirements of the present invention, it may be readily diverted into the sulfate process, without economic loss, thus to eliminate a special treatment to reduce the sodium sulfide content. Furthermore, the alkali carbonate instead of being incompletely sulfited may be converted to the acid sulfite and employed in an acid sulfite process, having the same base as used for the process of this invention.

In the forepart of this description, reference was made to certain disadvantages of the soda or modified soda process which are overcome by the present invention, especially those using caustic soda and sodium sulfite. One of these is the danger to humans of caustic solutions, which are very corrosive on the skin as compared to carbonates. Another is the difficulty of preparing the sulfite-caustic soda solution.

On regeneration of cooking liquor for such caustic soda processes from black liquor the carbonate is formed. This carbonate requires in addition to the sulfiting operation a causticizing operation. I eliminate this causticizing step by retaining the carbonate unsulfited. The causticizing step is usually necessary even though in the preparation of the cooking liquor a caustic soda is used initially instead of carbonate, because commercial caustic usually contains or readily forms a carbonate as impurity. It is customary to causticize this impurity. These causticizing operations when conducted in the presence of alkali sulfite present technical difficulties, the description of which will be omitted as forming no part of this invention. When an attempt is made otherwise to eliminate the causticizing operation, by over-sulfiting a soda solution and then adding caustic, a new condition is encountered. The sulfiting of the soda liberates carbonic acid gas ($CO_2$) which remains dissolved in the solution. This gas can only be removed with great operating difficulty and its removal is necessary for economy in the addition of the caustic soda. Thus, the present invention, besides providing a new and advantageous pulping process, also eliminates causticizing operations and the $CO_2$ removal required by other processes, and, furthermore, simplifies the preparation of the cooking liquor by the regeneration method.

The light color of the product is one of the prominent features recommending the use of this process. The black liquor contains a compound which is a chemical indicator like litmus, changing color at some definite pH value. The compound referred to darkens at a pH value higher than that imparted by my solution as present at the time such indicator is formed. If the solution is sufficiently alkaline to darken the indicator, the latter colors the pulp and the color cannot be readily washed out. If the pulp is washed prior to a darkening of the indicator, the latter is quite readily removed. Hence, to produce a light pulp it is important to prevent a high alkalinity in the presence of black liquor. The elimination of strong caustic soda from the alkaline processes and its replacement by a milder carbonate contribute largely to the causes of the light color of the pulp. As a measure of the pulp color, the following examples are given in Table III, in which E is a sample of unbleached tamarack and F is a sample of semi-bleached tamarack. The method used to determine the color consists in forming a sheet of the pulp sample and measuring the percent of light reflected by the sheet at different colors, expressed as their wave lengths in angstrom units.

Table III

| Wave length | Percent reflection | |
| --- | --- | --- |
| | E | F |
| 460 (blue and indigo) | 49 | 56 |
| 480 | 48 | 56 |
| 500 | 48 | 56 |
| 520 | 48 | 60 |
| 540 | 52 | 61 |
| 560 | 52 | 64 |
| 580 (yellow) | 55 | 65 |
| 600 | 57 | 65 |
| 620 | 58 | 65 |
| 640 (red and orange) | 58 | 66 |
| 660 | 61 | 66 |
| 680 | 63 | 65 |

The jack pine pulp is even lighter than the tamarack, above exemplified.

It is to be understood that the process is not limited to use with one kind of wood, such as the jack pine herein described. Not only may different woods of the same class, but woods of different classes may be cooked as mixtures, such as mixed poplar and pine. For example, I have successfully cooked birch and tamarack, the former a short-fibered hardwood, and the latter a long-fibered conifer. The cooking operation is extended to the period required for the slowest cooking wood without apparent damage to the pulp of the more rapidly cooking wood.

The pulp of such a mixture gives rise to certain operating advantages, especially when it is processed with a continuous filter discharging a cake or heavy sheet of pulp from a suction roll. The long fibers alone produce a sheet which readily breaks, whereas the presence of short fibers tends to strengthen the sheet by filling in the smaller spaces.

Another object in mixing woods for common digestion is to improve the color of the darker and stronger type of pulp by the presence of a lighter and weaker type of pulp. For example, when ten to twenty percent of birch is used with eighty to ninety percent of tamarack, the resultant pulp has been found to be as strong, within commercial limits, as the tamarack pulp alone, and to have a color considerably lighter than the tamarack pulp alone. It is not at all customary to mix short-fibered hardwood pulp into long-fibered coniferous pulp for this purpose. Not only does this hold true for birch and tamarack, but it has been found to follow from mixed aspen and pine pulps.

It has also been found that mixed tamarack and pine, woods of the same class, has a strength disproportionately nearer that of the stronger pulp when both are made by my process, and that they have a strength almost proportionate when both are made by the sulfate or kraft process.

Other advantages of cooking mixed woods of different classes will be obvious to those skilled in the art.

In the foregoing, I have described the process with reference to a sodium base, but it is understood that the chemically equivalent bases or the mixed bases are contemplated as will appear from the character of the appended claims.

What I claim is:

1. The method of preparing a wood cooking liquor containing essentially sodium sulfite and a sodium carbonate which comprises subjecting a solution containing essentially sodium carbonate to the action of sulfur dioxide until an alkalinity of about pH 7.5 to 9.5 is attained.

2. The method of preparing an alkaline sulfite wood cooking liquor containing essentially sodium sulfite and a sodium carbonate which comprises treating with sulfur dioxide a carbonate-containing solution of an alkaline sodium compound capable of reaction with sulfur dioxide to form sulfites until the alkalinity corresponds to a pH of about 7.5 to 9.5, there being sufficient carbonate present in the initial solution to impart the desired alkalinity.

3. In a wood digesting process, the method of recovering the base of a sodium containing waste black liquor from the digestion, which comprises adding to the liquor a material containing caustic soda, evaporating the liquor to a sirupy concentrated form, incinerating the concentrate to form an ash, whereby the sodium content is converted substantially all into sodium carbonate, leaching the carbonate from the ash, treating the leached liquor with a predetermined amount of sulfur dioxide, whereby to form sodium sulfite from a portion of the sodium carbonate, and to leave a predetermined amount of unsulfited sodium as a carbonate.

4. In a wood digesting process, the method of recovering the base of a sodium containing waste black liquor from the digestion, which comprises adding to the liquor a material containing caustic soda, evaporating the liquor to a sirupy concentrated form, incinerating the concentrate to form an ash, whereby the sodium content is converted substantially all into sodium carbonate, leaching the carbonate from the ash, treating the leach liquor with a predetermined amount of sulfur dioxide, whereby to form sodium sulfite from a portion of the sodium carbonate, and to convert the remainder of the sodium carbonate into sodium bicarbonate.

5. The method of treating wood digestion waste liquor containing a preponderating amount of sodium sulfite, a sodium carbonate, and substantially no caustic soda, which comprises adding caustic soda and concentrating the liquor in bulk to a sirupy mass, the amount of caustic soda added being at least sufficient to permit the concentration to take place without a separation of solids.

6. The method of treating a wood digestion waste liquor containing a preponderating amount of sodium sulfite, a sodium carbonate, and substantially no caustic soda, which comprises adding a pulp digestion waste liquor containing caustic soda and concentrating the liquor in bulk to a sirupy mass, the amount of caustic soda added being at least sufficient to permit the concentration to take place without a separation of solids.

7. The method of treating a wood digestion waste liquor containing a preponderating amount of alkali metal sulfite, an alkali metal carbonate, and substantially no caustic alkali, which comprises adding caustic alkali and concentrating the liquor in bulk to a sirupy mass, the amount of caustic alkali added being at least sufficient to permit the concentration to take place without a separation of solids.

8. In the treatment of wood digestion waste liquors containing initially considerable portions of a sodium sulfite, the step of rendering the waste liquor strongly alkaline with caustic soda, and concentrating the liquid to a syrupy mass, the alkalinity being such as to prevent precipitation of solids during the concentration to a syrup.

9. In the treatment of a wood digestion waste liquor containing prior to cooking a considerable portion of a sodium sulfite, the step of rendering the liquor alkaline to a hydrogen ion concentration corresponding to about pH 9, and concentrating the liquid to a syrupy mass, the alkalinity being such as to prevent precipitation of solids during the concentration to a syrup.

10. In the treatment of wood digestion waste liquor containing prior to cooking a considerable portion of sodium sulfite, the step of rendering the liquor alkaline to a hydrogen ion concentration of about pH 9, and evaporating said alkaline liquor to a concentration of 36° to 40° Bé. measured at 60° F., the alkalinity being such as to prevent precipitation of solids during the concentration to a syrup.

11. The method of operating conjointly two processes of wood digestion, one employing a solution basically of normal sodium sulfite, and the other employing a solution basically of caustic soda, which comprises mixing the waste black liquors of the two processes, the liquors being mixed in such proportion as to form a strongly alkaline solution in which upon concentration to a syrup the solids do not separate, concentrating the mixed liquor to form a syrup, incinerating the concentrate to form essentially a sodium carbonate residue, and converting the sodium carbonate into a cooking liquor for either process.

12. The method of operating conjointly two processes of wood digestion, one employing a solution basically of normal sodium sulfite, and the other employing a solution basically of caustic soda, which comprises mixing the waste black liquors of the two processes, adding caustic soda to form a strongly alkaline mixed liquor, concentrating the mixed liquor, incinerating the concentrate to form essentially a sodium carbonate residue, and converting the sodium carbonate into a cooking liquor for either process.

13. The method of operating conjointly two processes of wood digestion, one employing a solution containing sulfurous acid and a sodium base, and the other employing a solution basically of caustic soda, which comprises mixing the waste liquors of the two processes to form a liquor containing free caustic soda, the liquors being mixed in such proportion as to form a strongly alkaline solution in which upon concentration to a syrup the solids do not separate, concentrating the mixed liquor to form a syrup, incinerating the concentrate to form essentially a sodium carbonate residue, and converting the sodium carbonate into a cooking liquor for either process.

14. The method of operating conjointly two processes of wood digestion, one employing a solution containing sulfurous acid and a sodium base, and the other employing a solution basically of caustic soda, which comprises mixing the waste liquors of the two processes, adding caustic soda to form a strongly alkaline mixed liquor, concentrating the mixed liquor, incinerating the concentrate to form essentially a sodium carbonate residue, and converting the sodium carbonate into a cooking liquid for either process.

15. The method of operating conjointly a plurality of processes of wood digestion, each employing the same metal base and different compounds with said base, which comprises mixing the waste liquors of the two processes, adding sufficient caustic material of said metal base to permit concentration of the mixed liquor to a sirupy mass without the separation of solids, concentrating the mixed liquor to a sirupy mass, incinerating the concentrate to form essentially a carbonate residue of said base, and converting the carbonate into a cooking liquor for any of the processes.

CLINTON K. TEXTOR.